United States Patent [19]

Bobb

[11] 4,447,117
[45] May 8, 1984

[54] GATED FIBER OPTIC TRANSMISSION

[75] Inventor: Lloyd C. Bobb, Willow Grove, Pa.

[73] Assignee: The United States of America as represented by the Secretary of the Navy, Washington, D.C.

[21] Appl. No.: 395,557

[22] Filed: Jul. 6, 1982

[51] Int. Cl.³ .............................................. G02B 5/14
[52] U.S. Cl. .................. 350/96.15; 350/96.29; 250/227; 356/349
[58] Field of Search ............... 350/96.10, 96.15, 96.29, 350/385, 386, 393, 354; 356/349, 350; 250/227, 231 R

[56] References Cited

U.S. PATENT DOCUMENTS

| | | | |
|---|---|---|---|
| 3,705,992 | 12/1971 | Ippen et al. | 350/96.29 X |
| 3,746,983 | 7/1973 | Renz | 350/96.29 |
| 3,954,339 | 5/1976 | Atwood et al. | 350/96.10 |
| 4,059,759 | 11/1977 | Harney et al. | 350/385 X |
| 4,144,530 | 3/1979 | Redfern | 350/96.23 |
| 4,201,446 | 5/1980 | Geddes et al. | 350/96.29 |

Primary Examiner—David K. Moore
Assistant Examiner—Akm E. Ullah
Attorney, Agent, or Firm—Robert F. Beers; Henry Hansen; Armand M. Vozzo, Jr.

[57] ABSTRACT

A gated fiber optic sensor system is disclosed for increasing the effective optical path of a length of optical fiber cable. A pulse of polarized light having a known optical wavelength is directed into a length of optical fiber cable for propagation therethrough in a cyclic path. A planar semiconductor member is mounted in the path of the polarized light pulse at the Brewster angle to permit continuous transmission of the polarized light pulse through the cable until a light pulse of a second optical wavelength is made to impinge upon the semiconductor member, changing the reflectivity characteristics thereof and causing the polarized pulse to be extracted from its cyclic path for detection and processing. In one preferred embodiment, the optical fiber cable is configured in a loop to provide the cyclic path for the polarized light pulse, while in another preferred embodiment, the pulse path is provided by a straight section of optical fiber cable forming a part of a highly reflective cavity having reflectors on either end.

9 Claims, 3 Drawing Figures

GATED FIBER OPTIC TRANSMISSION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the transmission of light through optical fibers, and more particularly to an improved system for gating light propagated through a fixed length of optical fiber, used as a passive sensor, to increase its effective optical path.

Fiber optic sensors which utilize lengths of optical fiber cables to transmit light are widely employed as passive means for remotely detecting a variety of measurable physical quantities in an active medium. Many of the sensor effects and much of the accuracy provided by optical fiber cables depends on their optical path length in the active medium, and the typical method for improving accuracy is to increase the optical path length by increasing cable length. Although some sensor applications require optical fiber cable specifications of relatively low quality, many demand exacting optical standards, such as for index uniformity, birefringence, cladding and impurity concentrations, which are progressively difficult to maintain over extended cable lengths. Such high-quality lengths of optical fiber cable generally require special preparation in their fabrication so that, as a result, the cost of such cable lengths and the sensors in which they are utilized become very expensive, and in some cases, prohibitive.

SUMMARY OF THE INVENTION

Accordingly, it is a general purpose and object of the present invention to provide an improved fiber optic sensor system for propagating light through increased optical path lengths in an active environment so that a measurable physical quantity present in the environment may be more accurately detected.

Another object of the present invention is to provide a fiber optic sensor having improved optical detection capabilities and reduced fabrication costs.

Still another object of the present invention is to provide a fiber optic sensor system that is relatively simple yet highly reliable in performance, and easily adaptable to a variety of sensing applications.

Briefly, these and other objects of the present invention are accomplished by a gated fiber optic sensor system for increasing the effective optical path of a length of optical fiber cable. A pulse of polarized light having a known optical wavelength is directed into a length of optical fiber cable for propagation therethrough in a cyclic path. A planar semiconductor member is mounted in the path of the polarized light pulse at the Brewster angle to permit continuous transmission of the polarized light pulse through the cable until a light pulse of a second optical wavelength is made to impinge upon the semiconductor member, changing the reflectivity characteristics thereof and causing the polarized pulse to be extracted from its cyclic path for detection and processing. In one preferred embodiment, the optical fiber cable is configured in a loop to provide the cyclic path for the polarized light pulse, while in another preferred embodiment, the pulse path is provided by a straight section of optical fiber cable forming a part of a highly reflective cavity having reflectors on either end.

For a better understanding of these and other aspects of the present invention, reference may be made to the following detailed description taken in conjunction with the accompanying drawing in which like reference numerals and characters designate like parts throughout the figures thereof.

DESCRIPTION OF THE PREFERRED EMBODIMENT

Figure 1:
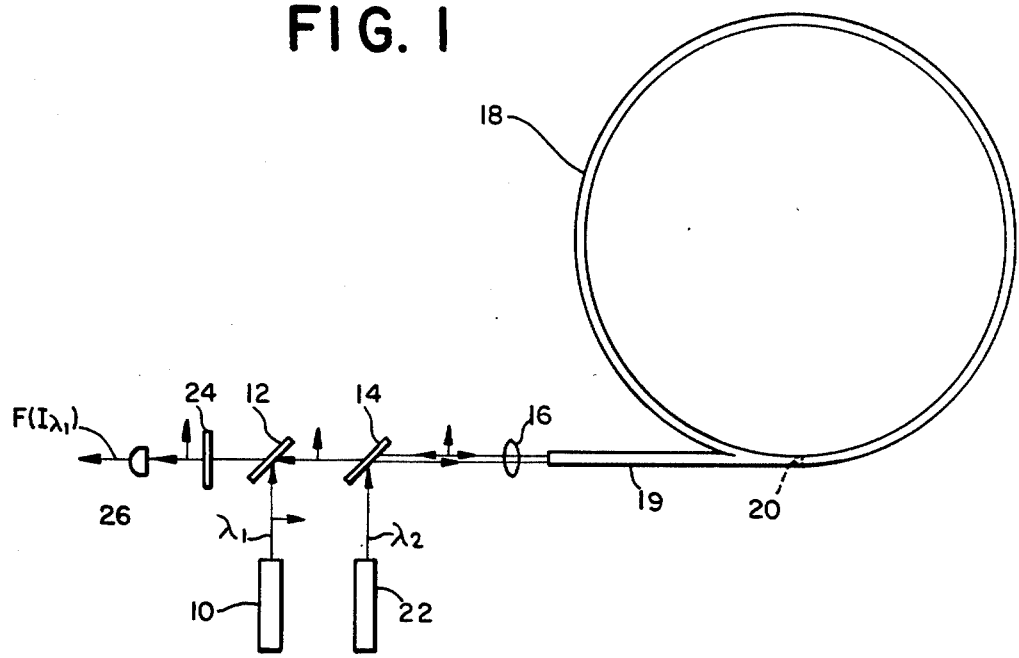
FIG. 1 is a schematic representation of one preferred embodiment of the gated fiber optic sensor system according to the present invention.

Referring now to FIG. 1, there is shown one preferred embodiment of a gated fiber optic sensor system which, in accordance with the present invention, includes a length of polarization-maintaining optical fiber cable formed into a loop 18 having a tail section 19 integrally attached thereto to permit light to pass into and out of the loop. Loop 18 is typically employed in an active environment to detect a desired physical quantity present therein based upon the optical effects caused by the quantity upon light propagated through the loop. The tail section 19 is shown to be directed substantially tangential to optical fiber loop 18, but may be disposed at a variety of angular positions relative to the loop depending on the direction of incoming light. A planar semiconductor member 20, better shown in FIG. 2 and described in greater detail hereinafter, is mounted in optical fiber loop 18 near its junction with tail section 19 to provide gating of light within the loop in accordance with the present invention.

A light source 10, typically a laser, for emitting a collimated light pulse of short duration, typically about one nanosecond, is optically coupled to optical fiber loop 18. Having a known optical wavelength $\lambda_1$ and polarized with its electric vector in the plane of incidence, as indicated by the arrows, the collimated light pulse is directed from light source 10 to a beam splitter 12. Beam splitter 12 is a conventional optical element designed to partially reflect the collimated light pulse of optical wavelength $\lambda_1$ and positioned to direct the reflected portion thereof substantially toward the tail section 19 of optical fiber loop 18. A lens element 16 is positioned to optically receive the reflected portion of light pulse of wavelength $\lambda_1$ from beam splitter 12 for focusing the light pulse into the tail section 19, the lens element receiving the pulse via second beam splitter 14, optically designed to transmit substantially all of the light pulse of wavelength $\lambda_1$.

The light pulse of wavelength $\lambda_1$ emitted from light source 10 enters the optical fiber loop 18 at tail section 19, thereafter circulating within the loop in a counterclockwise path of propagation. As described in greater detail hereinafter in regard to FIG. 2, planar semiconductor member 20 is disposed within loop 18 having its forward surface at the appropriate Brewster angle $\theta_B$ relative to the incident light pulse of optical wavelength $\lambda_1$ so that the semiconductor member is normally transparent to the $\lambda_1$ light pulse permitting continuous circulation thereof in the counterclockwise path within the loop.

It should be noted that a small portion of the energy of the light pulse circulating through optical fiber loop 18 may be lost on each pass through the junction region of the loop and tail section 19 depending on the fabrication and orientation of the junction. Therefore, the loss per cycle should be minimized in the formation of the junction, particularly since the circulating light pulse may be cycled through the loop 18 thousands of times.

A second light source 22 for generating a timed collimated light pulse having a second known optical wavelength $\lambda_2$ is optically coupled to loop 18 via beam splitter 14 and lens element 16. Light source 22 generates the $\lambda_2$ light pulse a controlled period of time after the generation of the $\lambda_1$ light pulse so that the $\lambda_1$ light pulse is permitted to circulate a known number of cycles within loop 18. Beam splitter 14 optically designed to be highly reflective of light of the second wavelength $\lambda_2$ is positioned to direct the light pulse from light source 22 into tail section 19 thereby impinging upon the surface of planar semiconductor member 20.

Figure 2:
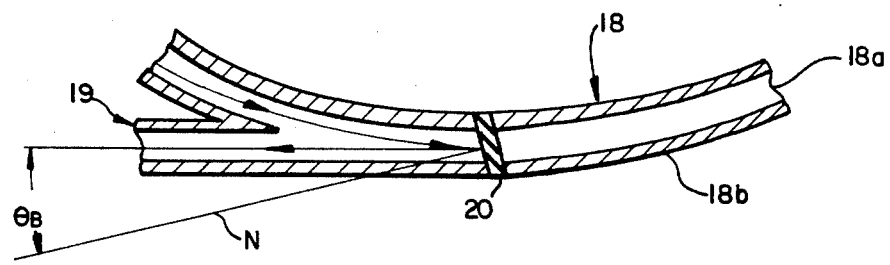
FIG. 2 is a magnified sectional view showing the disposition of the semiconductor member in the optical fiber loop employed in the gated fiber optic sensor system of FIG. 1.

Referring now to FIG. 2 in conjunction with FIG. 1 semiconductor member 20 is installed transverse to the optical fiber cable of loop 18, extending through the core 18a and cladding 18b of the cable near the junction of the loop and tail section 19. Fabricated of a conventional semiconductor material, such as silicon or germanium, which material is dependent upon the wavelength $\lambda_1$ of the polarized light pulse circulating through loop 18, the planar member is formed having a relatively thin section, typically about 10 $\mu m$. Within optical fiber loop 18, the semiconductor member 20 is inclined so that the planar surface thereof establishes the appropriate Brewster angle $\theta_B$ between the normal N to the surface of the semiconductor member and the incident polarized light pulse circulating through the loop. Well known in the art, the Brewster angle $\theta_B$ at the interface of two dielectric media is that angle of incidence for which a wave polarized parallel to the plane of incidence is wholly transmitted through the interface, the Brewster angle being mathematically defined as:

$$\theta_B = \cot^{-1}\frac{n_1}{n_2},$$

where $n_1$ and $n_2$ are the refractive indices of the respective dielectric media. In the case of the present invention, therefore, with $n_1$ being the refractive index of the core 18a of optical fiber loop 18 and $n_2$ being the refractive index of semiconductor member 20, the polarized light pulse of wavelength $\lambda_1$ is normally transmitted through the semiconductor member and continuously circulated through loop 18. It should be understood that if the refractive indices of core 18a and semiconductor member 20 are substantially equated, the semiconductor member would be installed orthogonally within loop 18 and the optical fiber cable used to fabricate the loop would not be required to maintain polarization.

Semiconductor member 20 is further characterized having reflectivity that changes significantly upon illumination by the light pulse of wavelength $\lambda_2$. Transient with each pulse of wavelength $\lambda_2$, the change in reflectivity of semiconductor member 20 results from the optical generation of an electronhole plasma within the semiconductor material by the $\lambda_2$ light pulse, the amount of reflectivity change being dependent on the plasma density which is a function of the excitation pulse energy of the $\lambda_2$ pulse. For purposes of the present invention, excitation energy density for the $\lambda_2$ pulse of about $10^{-2}$ J/cm$^2$ are sufficient to effectively change the reflectivity of the semiconductor member 20 so that, as an example, a typical fiber optic cable of 10$\mu$ or less in core diameter requires a pulse energy at $\lambda_2$ of approximately $10^{-8}$ joules. The onset time for the reflectivity change in semiconductor member 20 follows closely that of the excitation pulse with the decay time being dependent upon the diffusion of carriers from the plasma region, typically measured in picoseconds. Thus, semiconductor member 20 is caused to experience a large change in its reflectivity characteristic, from near-zero to about 0.85 coefficient of reflection, for the circulating $\lambda_1$ light pulse in a time frame, usually picoseconds, that is relatively short in comparison to the time period, about one nanosecond, required for the 80 1 light pulse to travel through loop 18.

When reflected by the semiconductor member 20 gated by the $\lambda_2$ light pulse, the polarized light pulse of wavelength $\lambda_1$ is converted into a clockwise propagating pulse and a portion thereof directed into the tail section 19 of loop 18. Emitted from tail section 19, the reflected $\lambda_1$ light pulse is directed through beam splitters 14 and 12, respectively, via lens element 16 and thereby made to impinge upon a narrow band pass optical filter 24, designed to transmit at the $\lambda_1$ wavelength and not at the $\lambda_2$ wavelength. An optical detector 26 is coupled to receive the $\lambda_1$ light pulse transmitter through filter 24 for producing an electrical signal $F(I_{\lambda_1})$ that is a function of the intensity of the detected $\lambda_1$ light pulse and indicative of the measure of the desired physical quantity present in the environment. The electrical signal $F(I_{\lambda_1})$ may be fed to a conventional signal processor (not shown) for apropriate conversion and utilization of the signal information.

Figure 3:
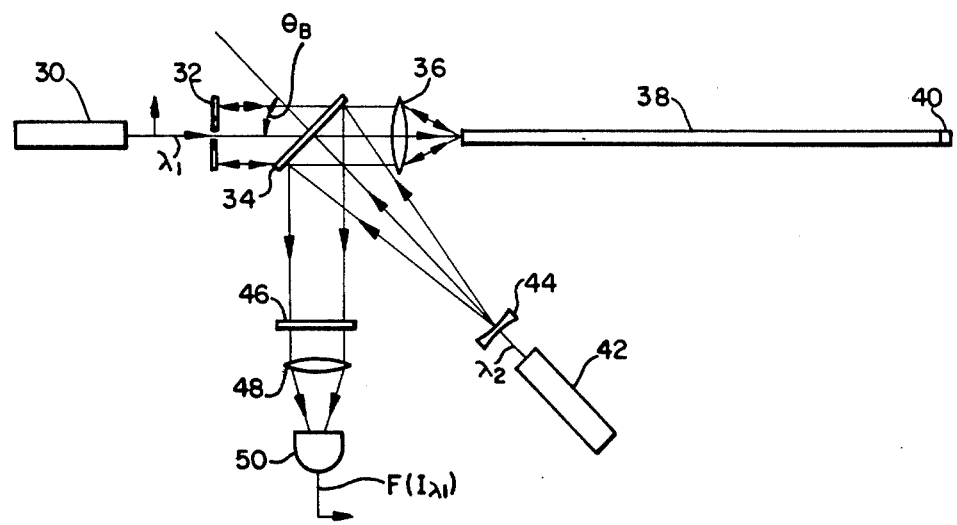
FIG. 3 is a diagrammatic illustration of another preferred embodiment of the gated fiber optic sensor system in accordance with the present invention.

Referring now to FIG. 3, there is shown another preferred embodiment of the gated fiber optic sensor system of the present invention including a straight section of polarization-maintaining optical fiber cable 38 which, like loop 18, is typically placed in an active environment to detect some desired physical quantity present therein. A reflector 40 is secured at one end of the optical fiber cable 38 while a second reflector 32 having a small hole, generally less than one millimeter in diameter, formed therein is positioned apart from the opposite end of the optical fiber cable to form a highly-reflective cavity for the cyclic propagation of light. A planar semiconductor member 34, similar to member 20 in FIGS. 1 and 2, is located between reflector 32 and the near end of optical fiber cable 38, and is incided at the appropriate Brewster angle $\theta_B$ to permit proper light transmission therethrough.

A light source 30 for generating a pulse of collimated, vertically polarized light having an optical wavelength $\lambda_1$ is directed to emit the $\lambda_1$ light pulse through the hole in total reflector 32. Totally transmitted by semiconductor member 34 at the Brewster angle $\theta_B$, the $\lambda_1$ light pulse from light source 30 is projected through a lens element 36 and into the optical fiber cable 38. Propagated through the optical fiber cable 38, the $\lambda_1$ light pulse is reflected back through the cable to exit therefrom with its intensity spread over a range of angles. Collected and collimated by lens element 36, the $\lambda_1$ light pulse is again transmitted with little loss through semiconductor member 34 to reflector 32 where substantially all of the light pulse is returned to cable 38 for continued cyclic propagation.

A second light source 42 for generating a timed, collimated light pulse of a second wavelength $\lambda_2$ is derected to emit the $\lambda_2$ light pulse via a lens 44 upon the surface of semiconductor member 34. Light source 42, like source 22, is controlled to generate the $\lambda_2$ light pulse a certain period of time after $\lambda_1$ pulse generation so that the $\lambda_1$ pulse is permitted to make a significant number of passes, typically in the thousands, through the optical fiber cable 38. Having transient reflectivity characteristics similarly affected by the $\lambda_2$ pulse, semiconductor member 34, like member 20, reflects the propagating $\lambda_1$ pulse upon illumination by the $\lambda_2$ pulse and thereby directs the reflected $\lambda_1$ pulse to optical detector 50 via narrow bandpass filter 46 and lens 48. Like detector 26, optical detector 50 produces an electrical signal $F(I_{\lambda 1})$ for further processing that is a function of the intensity of the detected $\lambda_1$ light pulse and a measure of the desired physical quantity present in the environment.

Therefore, it is apparent that the disclosed invention provides an improved fiber optic sensor system for propagating light through increased optical path lengths in an active environment so that a measurable physical quantity present in the environment may be more accurately detected. Furthermore, the present invention provides a fiber optic sensor having improved optical detection capabilities and reduced fabrication costs. In addition, the disclosed gated fiber optic sensor system is relatively simple yet highly reliable in performance, and easily adaptable to a variety of sensing applications.

Obviously, other embodiments and modifications of the present invention will readily come to those of ordinary skill in the art having the benefit of the teachings presented in the foregoing description and drawings. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed is:

1. A gated fiber optic sensor system, comprising:
    a first light source for generating a pulse of light having a first optical wavelength;
    optical fiber means coupled to said first light source for propagating the first light pulse in a continuous cyclic path;
    a second light source coupled to said optical fiber means for generating a pulse of light having a second optical wavelength; and
    semiconductor means affixed to said optical fiber means for gating the propagation of the first light pulse with the second light pulse so that the first light pulse is extracted from the continuous cyclic path.

2. A gated fiber optic sensor system according to claim 1, wherein said semiconductor means comprises:
    a planar semiconductor member mounted within said optical fiber means along the continuous cyclic path.

3. A gated fiber optic sensor system according to claim 2, further comprising:
    optical detector means coupled to said optical fiber means for producing an electrical signal indicative of the extracted light pulse.

4. A gated fiber optic sensor system according to claim 2, wherein said optical fiber means comprises:
    a length of optical fiber cable configured in a loop to provide a circular path of propagation for the first light pulse.

5. A gated fiber optic sensor system according to claim 2, wherein said optical fiber means comprises:
    a straight section of optical fiber cable;
    a first reflector attached at one end of said straight section; and
    a second reflector positioned apart from the opposite end of said straight section and having a small hole formed therein to permit the first light pulse to enter said straight section.

6. A gated fiber optic sensor system, comprising:
    a first light source for generating a pulse of light having a first optical wavelength and polarized parallel to its plane of incidence;
    optical fiber means optically coupled to said first light source for propagating the first light pulse in a continuous cyclic path;
    a planar member fabricated of a semiconductor material and mounted within said optical fiber means along the continuous cylic path at the appropriate Brewster angle for the first light pulse; and
    a second light source optically coupled to illuminate said planar member with a light pulse of a second optical wavelength so that the first light pulse is extracted from the continuous cyclic path.

7. A gated fiber optic sensor system according to claim 6, further comprising:
    optical detector means coupled to said optical fiber means for producing an electrical signal indicative of the extracted light pulse.

8. A gated fiber optic sensor system according to claim 6 wherein said optical fiber means comprises:
    a length of optical fiber cable configured in a loop to provide a circular path of propagation for the first light pulse.

9. A gated fiber optic sensor system according to claim 6, wherein said optical fiber means comprises:
    a straight section of optical fiber cable;
    a first reflector attached at one end of said straight section; and
    a second reflector positioned apart from the opposite end of said straight section and having a small hole formed therein to permit the first light pulse to enter said straight section.

* * * * *